United States Patent
Rasumov

(10) Patent No.: US 11,475,384 B2
(45) Date of Patent: *Oct. 18, 2022

(54) NON-INTRUSIVE TECHNIQUES FOR DISCOVERING AND USING ORGANIZATIONAL RELATIONSHIPS

(71) Applicant: SecurityScorecard, Inc., New York, NY (US)

(72) Inventor: Nikon Rasumov, New York, NY (US)

(73) Assignee: SecurityScorecard, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,262

(22) Filed: Sep. 18, 2019

(65) Prior Publication Data
US 2020/0034762 A1 Jan. 30, 2020

Related U.S. Application Data

(63) Continuation of application No. 15/198,560, filed on Jun. 30, 2016, now Pat. No. 10,515,328, which is a (Continued)

(51) Int. Cl.
*G06Q 10/06* (2012.01)
*H04L 9/40* (2022.01)
(Continued)

(52) U.S. Cl.
CPC ... *G06Q 10/0635* (2013.01); *G06F 16/24578* (2019.01); *G06F 21/562* (2013.01);
(Continued)

(58) Field of Classification Search
None
See application file for complete search history.

(56) References Cited

U.S. PATENT DOCUMENTS 8,484,066 B2  7/2013  Miller et al.
8,595,240 B1 * 11/2013  Otey ............... G06F 16/951
                                                707/749

(Continued)

FOREIGN PATENT DOCUMENTS

EP          2611106 A1 *  7/2013  .......... H04L 12/585
WO   WO-2008/140683 A2   11/2008
WO   WO-2013012599 A2    1/2013

OTHER PUBLICATIONS

Monitoring and Verifying Cybersecurity Controls and Effectiveness. Sep. 11, 2017. pp. 1-9 (Year: 2017).*

(Continued)

*Primary Examiner* — Patricia H Munson
*Assistant Examiner* — Nancy N Prasad
(74) *Attorney, Agent, or Firm* — Norton Rose Fulbright US LLP

(57) ABSTRACT

The present disclosure provides techniques for calculating an entity's cybersecurity risk based on identified relationships between the entity and one or more vendors. Customer/vendor relationships may impact the cybersecurity risk for each of the parties involved because a security compromise of a downstream or upstream provider can lead to a compromise of multiple other companies. For example, if organization A uses B (e.g., a cloud service provider) to store files, and B is compromised, this may lead to organization A being compromised (e.g., the files organization A stored using B may have been compromised by the breach of B's cybersecurity). Embodiments of the present disclosure further provide a technique for calculating a cybersecurity risk score for an organization based on identified customer/vendor relationships.

21 Claims, 9 Drawing Sheets

Related U.S. Application Data continuation of application No. 15/046,318, filed on Feb. 17, 2016, now Pat. No. 10,268,976.

(51) Int. Cl.

| | | |
|---|---|---|
| *G06F 16/2457* | (2019.01) | |
| *G06F 21/56* | (2013.01) | |
| *G06F 21/57* | (2013.01) | |
| *H04L 67/02* | (2022.01) | |
| *G06F 21/62* | (2013.01) | |

(52) U.S. Cl.
CPC ........ *G06F 21/577* (2013.01); *G06F 21/6218* (2013.01); *H04L 63/1433* (2013.01); *H04L 63/1483* (2013.01); *H04L 67/02* (2013.01); *G06F 2221/2101* (2013.01); *G06F 2221/2119* (2013.01)

(56) References Cited

U.S. PATENT DOCUMENTS

| | | | |
|---|---|---|---|
| 8,918,883 B1 | 12/2014 | Boyle et al. | |
| 9,294,498 B1 | 3/2016 | Yampolskiy et al. | |
| 2001/0037253 A1* | 11/2001 | Kensey | G06Q 30/06 705/26.8 |
| 2005/0114484 A1* | 5/2005 | Wilson | H04L 61/30 709/218 |
| 2006/0218151 A1* | 9/2006 | Adelman | H04L 61/4557 707/E17.115 |
| 2008/0270203 A1* | 10/2008 | Holmes | G06Q 30/0201 705/7.29 |
| 2008/0270209 A1* | 10/2008 | Mauseth | G06Q 30/0201 705/7.29 |
| 2009/0171678 A1* | 7/2009 | Zimmerman | G06Q 40/04 705/310 |
| 2009/0210419 A1* | 8/2009 | Chitnis | G06F 16/951 |
| 2009/0234812 A1* | 9/2009 | Gupta | G06F 16/951 707/999.005 |
| 2010/0186088 A1* | 7/2010 | Banerjee | G06F 21/51 709/224 |
| 2011/0035287 A1* | 2/2011 | Fox | G06Q 30/02 705/26.1 |
| 2013/0212658 A1 | 8/2013 | Amaya Calvo et al. | |
| 2014/0074584 A1 | 3/2014 | Fisher | |
| 2014/0337973 A1 | 11/2014 | Foster et al. | |
| 2015/0039599 A1* | 2/2015 | Carroll | G06F 16/955 707/723 |
| 2015/0154156 A1* | 6/2015 | Meyers, Jr. | G06F 40/134 715/205 |
| 2015/0207813 A1 | 7/2015 | Reybok et al. | |
| 2015/0229664 A1 | 8/2015 | Hawthorn et al. | |
| 2015/0256556 A1* | 9/2015 | Kaminsky | H04L 63/168 726/23 |
| 2017/0048267 A1 | 2/2017 | Yampolskiy et al. | |
| 2017/0078308 A1 | 3/2017 | Temm | |
| 2017/0078315 A1 | 3/2017 | Allen et al. | |
| 2017/0346839 A1* | 11/2017 | Peppe | G06F 21/552 |
| 2017/0346846 A1 | 11/2017 | Findlay | |
| 2018/0146004 A1 | 5/2018 | Belfiore, Jr. et al. | |
| 2018/0359264 A1 | 12/2018 | Sweet et al. | |
| 2019/0034641 A1 | 1/2019 | Gil et al. | |
| 2019/0141063 A1 | 5/2019 | Hamdi | |

OTHER PUBLICATIONS

Reference Gitlab. Date: Sep. 6, 2016: https://about.gitlab.com/blog/2016/09/06/resolving-merge-conflicts-from-the-gitlab-ui/ (Year: 2016).*

* cited by examiner

710

Candidate URLs
- "hypothetical template":"https://genericwebsite.com/<company A>"
- "hypothetical template":"https://<company B>.genericwebsite.com"

720

Search Engine Query
- site: genericwebsite.com "signon" OR "sign on" OR "signin" OR "sign in" OR "login" OR "log in" OR "username" OR "password"  -inurl:www -inurl:www2 -inurl:www3 -inurl:support -inurl:community -inurl:developer -inurl:developers -inurl:help -inurl:helpdesk -inurl:blog -inurl:forum -inurl:forums -inurl:wiki inurl:https

730

Candidate URL Analysis
- Count 5: "template":"https://genericwebsite.com/<company A>", "https://genericwebsite.com/<company B>", "https://genericwebsite.com/<company C>", "https://genericwebsite.com/<company D>", "https://genericwebsite.com/<company E>"
- Count 1000: "template":"https://<company H>.my.salesforce.com", etc.

740

Template Exploration Results
- Unresolved: https://genericwebsite.com/<company A> - resolves in a 404 error
- Generic: https://genericwebsite.com/<company B> - resolves in landing page with a generic logo
- Unique: https://genericwebsite.com/<company C> - resolves in landing page for a login with company C logo

750

Vendor Client List
- vendor: <company A> has clients: <company B>, <company C>, <company D>

760

List of Companies and Clients
- <company A> has clients: <company B>, <company C>, <company D>
- <company B> has vendor: <company A>
- <company C> has vendor: <company A>
- <company D> has vendor: <company A>

FIG. 7

NON-INTRUSIVE TECHNIQUES FOR DISCOVERING AND USING ORGANIZATIONAL RELATIONSHIPS

CROSS-REFERENCE TO RELATED APPLICATIONS

This application is a continuation of U.S. patent application Ser. No. 15/198,560, filed Jun. 30, 2016, and entitled "NON-INTRUSIVE TECHNIQUES FOR DISCOVERING AND USING ORGANIZATIONAL RELATIONSHIPS", which is a continuation of U.S. patent application Ser. No. 15/046,318, filed Feb. 17, 2016, and entitled "NON-INTRUSIVE TECHNIQUES FOR DISCOVERING AND USING ORGANIZATIONAL RELATIONSHIPS," that issued Apr. 23, 2019, as U.S. Pat. No. 10,268,976, the disclosures of which are incorporated by reference herein in their entirety.

TECHNICAL FIELD

The present application is generally related to the technical field of corporate cybersecurity technology, and more particularly to techniques for discovering organizational relationships and calculating an entity's cybersecurity risk based on discovered organizational relationships.

BACKGROUND OF THE INVENTION

As the availability of access to various networks, such as the Internet, cellular data networks, etc., has increased, so too has the mobility of electronic devices. As a result of this increased mobility and access, more and more information is being stored in, and services provided through, the cloud. This has created an Internet ecosystem where corporate entities establish relationships (e.g., customer/vendor relationships, vendor/vendor relationship, etc.) with various third parties that provide cloud and other network accessible services (e.g., software-as-a-service applications, etc.) to the corporate entities. For example, many corporations use Box.com® to store and access data. Such corporations may be considered to have a customer/vendor relationship with Box.com®, where Box.com® is the vendor, and each of the corporate entities that use Box.com® are the customers. Such relationships make it difficult to assess the cybersecurity risk of an organization (e.g., because the risk may be dependent upon not only the level of cybersecurity that an organization has, but also on the level of cybersecurity that its vendors have). However, identifying these types of relationships is often difficult, as vendors do not readily provide or otherwise make their customer list available to third parties. Thus, discovering such relationships is often difficult. Further, the lack of accurate relationship information makes assessing aggregate cybersecurity risk for an organization difficult, and often inaccurate (e.g., because of unknown relationships).

BRIEF SUMMARY OF THE INVENTION

Embodiments of the present disclosure provide systems, methods, and computer-readable storage media that provide non-intrusive techniques for discovering relationships between organizations (e.g., customer/vendor relationships, vendor/vendor relationships, and the like). For example, if an organization (e.g., a bank) uses cloud services provided by one or more vendors (e.g., cloud service providers), embodiments of the present disclosure provide non-intrusive techniques for discovering the existence of the relationships (e.g., a customer/vendor relationship) between the organization and each of the one or more vendors (e.g., the organization is a customer of each of the one or more vendors).

Additionally, embodiments of the present disclosure provide systems, methods, and computer-readable storage media for calculating an entity's cybersecurity risk based on discovered organizational relationships. Organizational relationships may impact the cybersecurity risk for each of the organizations involved because a security compromise of a downstream or upstream organization can lead to a compromise of multiple other organizations. As an example, if organization A uses B (e.g., a cloud service provider) to store files, and B is compromised, this may lead to organization A being compromised (e.g., the files organization A stored using B may have been compromised by the breach of B's cybersecurity). This type of cybersecurity threat may also be indirect (e.g., the breached organization does not have a direct customer/vendor relationship with the breached party). For example, if B, above, is hosted by an organization C, and then organization C is compromised, this could lead to a domino effect where multiple other organizations are compromised, such as B and/or A. In the scenarios above, it can be seen that the aggregate cybersecurity risk of A is dependent upon: 1) the level of cybersecurity that A has; and 2) the level of cybersecurity that various vendors having direct and indirect relationships with A have. Embodiments of the present disclosure provide a technique for identifying customer/vendor relationships between organizations. Additionally, embodiments of the present disclosure provide techniques for calculating a cybersecurity risk score for an organization based on identified customer/vendor relationships of the organization.

The foregoing has outlined rather broadly the features and technical advantages of the present invention in order that the detailed description of the invention that follows may be better understood. Additional features and advantages of the embodiments will be described hereinafter which form the subject of the claims of the present disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 7 is a block diagram illustrating various aspects of an embodiment for identifying relationships between an entity and one or more vendors according to an embodiment;

DETAILED DESCRIPTION OF THE INVENTION

Figure 1:
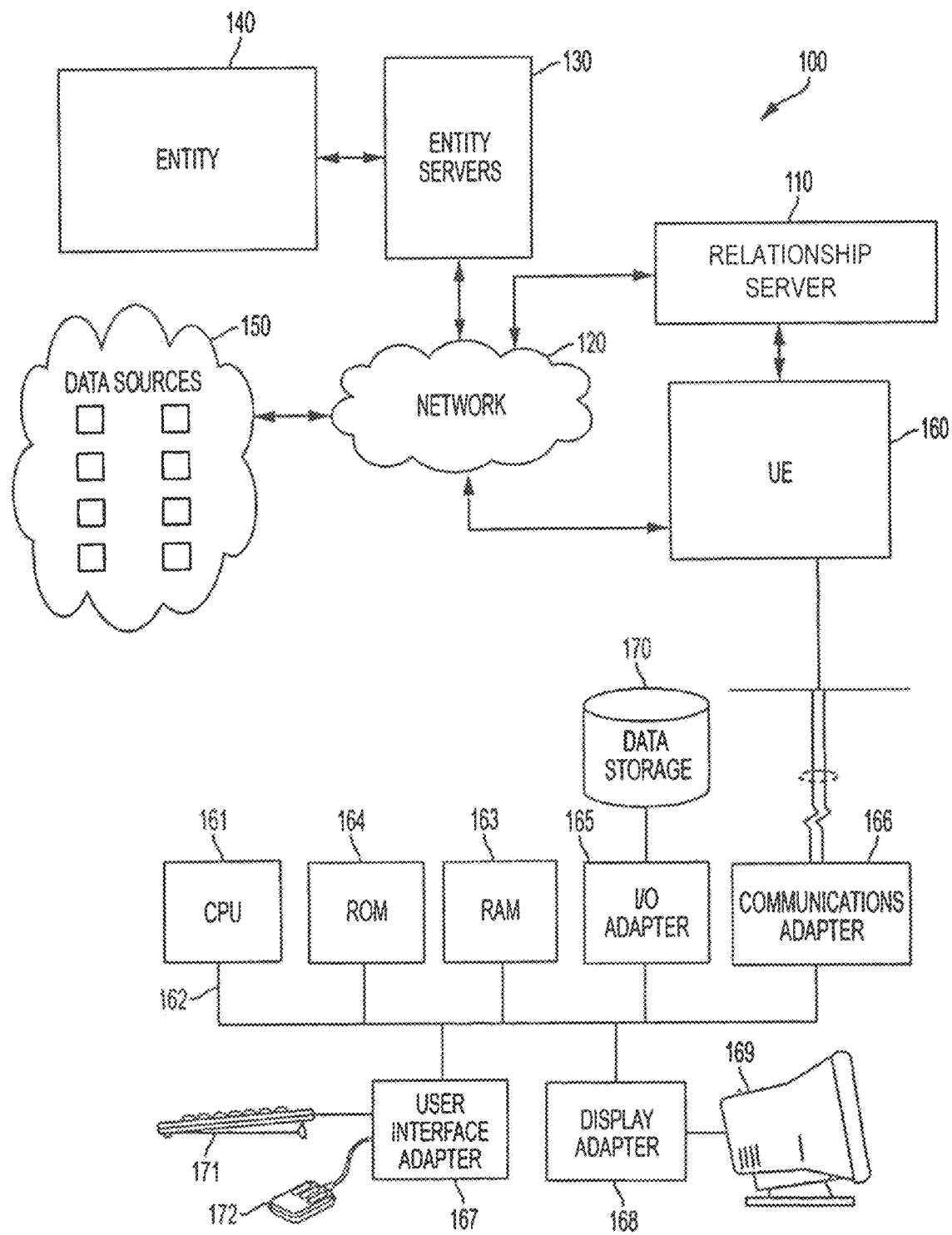
FIG. 1 is a block diagram of a system that includes a server for discovering organizational relationships and for calculating an entity's cybersecurity risk based on the discovered organizational relationships according to an embodiment.

An entity's knowledge of its cybersecurity risks, as well as those of its current, former, and potential future business partners, such as any vendors that may provide services to the entity, may serve as strategic information used to guide the entity's cybersecurity and business decisions. To provide an accurate picture of an entity's cybersecurity risk, the concepts and embodiments described herein involve discovering organizational relationships between the entity and other organizations (e.g., the entity's vendors, the entity's customers, etc.). Non-intrusive data collection involves collecting data from a source for which permission from the entity whose cybersecurity risk is calculated is not required. In contrast, intrusive data collection involves collecting data from a source for which permission from the entity whose cybersecurity risk is calculated is required. Embodiments of the present disclosure utilize various non-intrusive techniques, described in more detail below, to collect information that would most likely not be accessible via intrusive techniques. For example, a company may be reluctant to provide information regarding all of the vendors that it uses in its ordinary course of business, and a vendor may likewise be reluctant to provide a list of all of its customers (e.g., for purposes of calculating a cybersecurity risk for the entity). Non-intrusive data collection techniques utilized in accordance with embodiments of the present disclosure may be employed to discover organizational relationships between various organizations, and to provide a detailed assessment of an entity's cybersecurity risk (e.g., based on discovered organizational relationships). Nevertheless, these non-intrusive data collection techniques may be used in conjunction with other data collection techniques, such as intrusive data collection techniques, to provide a requisite level of performance—depending on the objective.

The collected data is used to identify relationships between various entities to create a mapping or graph of an Internet ecosystem representing vendor/client relationships. In an embodiment, these relationships may be used to calculate or assess an aggregate cybersecurity risk for an entity. The aggregate cybersecurity risk may provide an indication of the level of cybersecurity for a target entity, and may further indicate how the entity's cybersecurity risk is affected by the entity's relationships with one or more third parties.

In an embodiment, a scorecard system may be used to calculate the cybersecurity risk score based on discovered relationships. The scorecard system may use the calculated cybersecurity risk score to determine ranking, percentile, and other detailed cybersecurity risk information about the entity, and this information may be used to determine how various relationships that the entity has with third parties impact the entity's cybersecurity risk. Additionally, the cybersecurity risk score calculated according to embodiments may provide information that may be used by third parties to assess the cybersecurity risk of the entity in connection with establishing a relationship with the entity.

As will be further discussed below, the disclosed embodiments facilitate the discovery of organizational relationships, and allow the cybersecurity risk score for an entity to be updated via real-time monitoring based on the discovered relationships. Also, the scorecard system allows the cybersecurity risk score to be determined nearly instantly, or in near real-time. As a result, an entity can use the scorecard system to track its historical performance, as well as monitoring how the entity's cybersecurity risk is impacted by third parties that have relationships with the entity, which may allow the entity to be proactive in preventing a cybersecurity threat.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring to FIG. 1, a block diagram of network 100 that includes a relationship server 110, a communication network 120, an entity server 130, an entity 140, data sources 150, and user station 160 is shown. In an embodiment, the relationship server 110 may include one or more servers that, according to one embodiment, are configured to perform several of the functions described herein with reference to FIG. 2. One or more of the servers comprising the relationship server 110 may include memory, storage hardware, software residing thereon, and one or more processors configured to perform functions associated with network 100. For example, components comprising user station 160, such as CPU 162, can be used to interface and/or implement the relationship server 110. Accordingly, the user station 160 may serve as a cybersecurity risk assessment portal by which a user may access a scorecard system disclosed herein. The portal can function to allow multiple users, inside and outside network 100 (e.g., at multiple instances of user station 160), to interface with one another. One of skill in the art will readily recognize that different server and computer architectures can be utilized to implement the relationship server 110, and that the relationship server 110 is not limited to a particular architecture so long as the hardware implementing relationship server 110 supports the functions of the scorecard system disclosed herein with reference to FIGS. 1-7.

The communication network 120 may facilitate communication of data between the relationship server 110 and the data sources 150. The communication network 120 may also facilitate communication of data between the relationship server 110 and other servers/processors, such as entity server 130. The communication network 120 may include any type of communications network, such as a direct PC-to-PC connection, a local area network (LAN), a wide area network (WAN), a modem-to-modem connection, the Internet, a combination of the above, or any other communications network now known or later developed within the networking arts which permits two or more electronic devices to communicate.

The entity server 130 may comprise the servers which the entity 140 uses to support its operations. In some embodiments, the relationship server 110 may access the entity server 13 to collect information that may be used to calculate an entity's cybersecurity risk. The data sources 150 include the sources from which the relationship server 110 collects information to calculate and benchmark an entity's cybersecurity risk.

The entity 140 may include any organization, company, corporation, or group of individuals. For example, one entity may be a corporation with thousands of employees and headquarters in New York City, while another entity may be a group of one or more individuals associated with a website and having headquarters in a residential home.

Data sources 150 may include any source of data accessible over communication network 120. By way of example, and not limitation, one source of data can include a website associated with a company, while another source of data may be an online database of various information. In general, the data sources 150 may be sources of any kind of data, such as domain name data, social media data, multimedia data, IP address data, and the like. One of skill in the art would readily recognize that data sources 150 are not limited to a particular data source, and that any source from which data may be retrieved may serve as a data source so long as it can be accessed via the communication network 120.

With respect to user station 160, the central processing unit ("CPU") 161 is coupled to the system bus 162. The CPU 161 may be a CPU or microprocessor, a graphics processing unit ("GPU,), and/or microcontroller that has been programmed to perform the functions of the relationship server 110, as described in more detail below with reference to FIGS. 2, 6, and 7. Embodiments are not restricted by the architecture of the CPU 161 so long as the CPU 161, whether directly or indirectly, supports the operations described herein. The CPU 161 is one component that may execute the various described logical instructions.

The user station 160 also comprises random access memory (RAM) 163, which can be synchronous RAM (SRAM), dynamic RAM (DRAM), synchronous dynamic RAM (SDRAM), or the like. The user station 160 may utilize the RAM 163 to store the various data structures used by a software application. The user station 160 may also comprise read only memory (ROM) 164 which can be PROM, EPROM, EEPROM, optical storage, or the like. The ROM may store configuration information for booting the user station 160. The RAM 163 and the ROM 164 hold user and system data, and both the RAM 163 and the ROM 164 may be randomly accessed.

The user station 160 may also comprise an input/output (I/O) adapter 165, a communications adapter 166, a user interface adapter 167, and a display adapter 168. The I/O adapter 165 and/or the user interface adapter 167 may, in certain embodiments, enable a user to interact with the user station 160. In a further embodiment, the display adapter 168 may display a graphical user interface (GUI) associated with a software or web-based application on a display device 169, such as a monitor or touch screen.

The I/O adapter 165 may couple one or more storage devices 170, such as one or more of a hard drive, a solid state storage device, a flash drive, a compact disc (CD) drive, a floppy disk drive, and a tape drive, to the user station 160. Also, the data storage 170 can be a separate server coupled to the user station 160 through a network connection to the I/O adapter 165. The communications adapter 166 can be adapted to couple the user station 160 to a network, which can be one or more of a LAN, WAN, and/or the Internet. Therefore, in some embodiments, the cybersecurity risk assessment portal 160 may be an online portal. The user interface adapter 167 couples user input devices, such as a keyboard 171, a pointing device 172, and/or a touch screen (not shown) to the user station 160. The display adapter 168 can be driven by the CPU 161 to control the display on the display device 169. Any of the devices 161-168 may be physical and/or logical.

The concepts described herein are not limited to the architecture of user station 160. Rather, the user station 160 is provided as an example of one type of computing device that can be adapted to perform the functions of the relationship server 110 of embodiments and/or the user interface device 165. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user station 160, or certain components thereof, may reside at, or be installed in, different locations within network 100.

Figure 2:
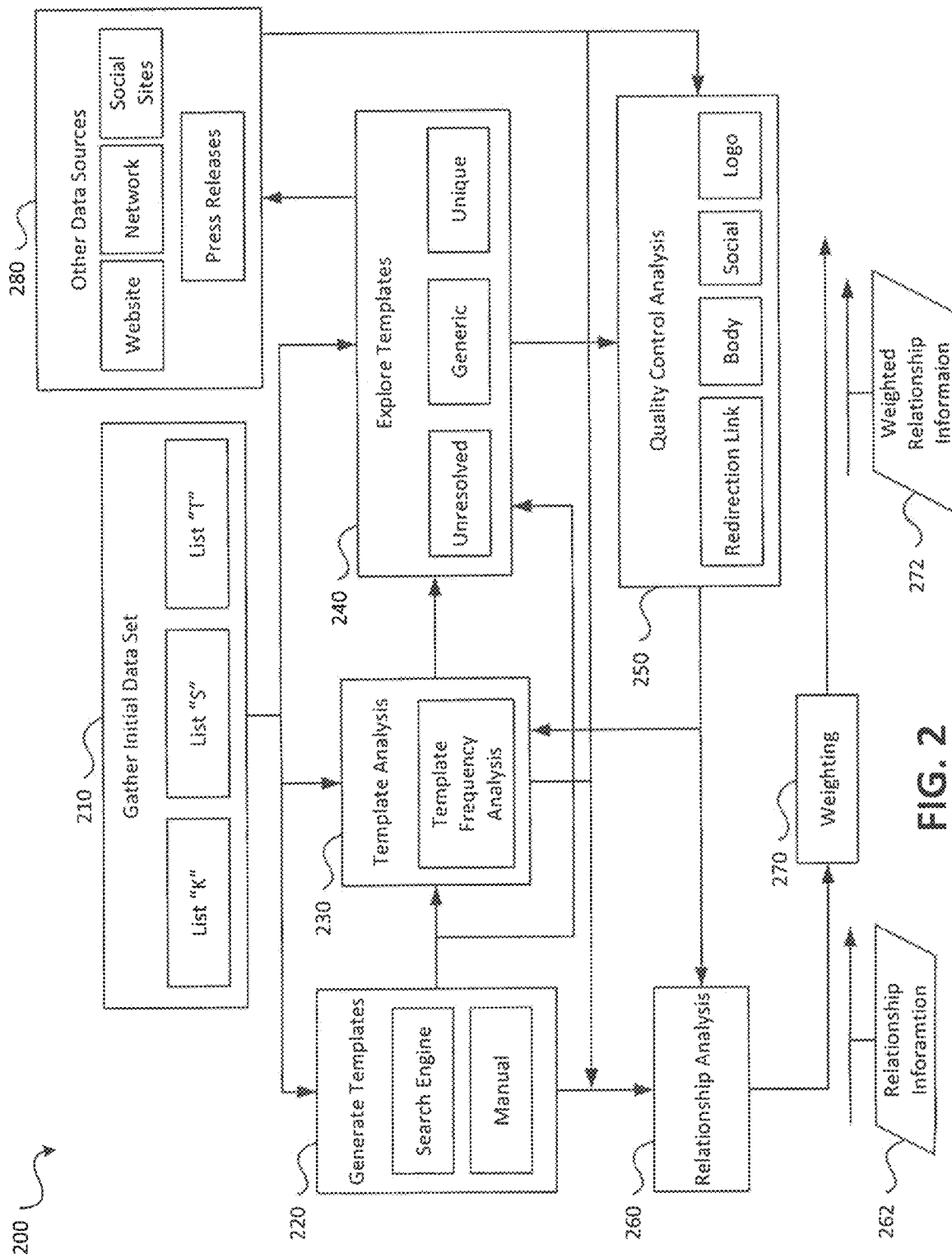
FIG. 2 is a block diagram of an embodiment of system for discovering organizational relationships according to an embodiment.

Referring to FIG. 2, a block diagram of a system for discovering organizational relationships according to an embodiment is shown as a system 200. In an embodiment, the system 200 may be implemented with one or more computing devices, such as the relationship server 110, entity servers 130, and user station(s) 160 of FIG. 1. As shown in FIG. 2, in an embodiment, the system 200 may comprise a gather initial data set module 210, a template generation module 220, a template analysis module 230, a template exploration module 240, a quality control analysis module 250, a relationship analysis module 260, a weighting module 270, and an additional data sources module 280. In an embodiment, the system 200 may be configured to execute one or more routines that perform various operations to discover organizational relationships, as described in more detail below.

The gather initial data set module 210 may access information (e.g., information stored in the data storage 170) to identify a set of data that may be used passed to the template generation module 220 in connection with generation of one or more candidate URL templates. In an embodiment, the set of data may be determined using a list "S" comprising company names and a list "K" of keywords. In an embodiment, the company names identified in the list "S" and the keywords identified in list "K" may be selected from a list "T" comprising a database of all known company names and keywords. The keywords may correspond to words that have been identified as suggesting a relationship between a vendor and a company. For example, the keywords may comprise words such as "signin" and its various other permutations (e.g., "sign in," "sign on," "login," "log on," and the like), or other words indicative of an account with a vendor, such as "username," "user name," "password," and the like. The keywords included in the list "K" may be indicative of a relationship (e.g., an account that a company has with a vendor), as will be described in more detail below. The companies identified in the list "S" may correspond to companies of interest (e.g., companies for which a cybersecurity risk score is desired), and/or may comprise companies that are likely to be relevant to the companies of interest (e.g., vendors of interest). In an embodiment, the companies identified in the list "S" may be identified from the list "T." Once the gather initial data set module 210 has identified the initial set of data, it may pass the initial set of data to the template generation module 220.

The template generation module 220 may comprise one or more routines, executable by one or more processors (e.g., the CPU 161 of FIG. 1) to generate one or more candidate universal resource locators (URLs) associated with a first vendor. In an embodiment, the one or more routines may be stored as instructions that are executable by a processor, such as the CPU 161 of FIG. 1. Each of the candidate URLs may comprise first information corresponding to a website associated with a vendor, and second information associated with a company (e.g., one of the companies identified in list "S" of the initial data set received from the gather initial data set module 210).

For example, and referring briefly to FIG. 7, a block diagram illustrating various aspects of an embodiment for identifying relationships between an entity and one or more vendors according to an embodiment is shown. In FIG. 7, various embodiments of candidate URLs 710 are illustrated. Each of the candidate URLs 710 includes first information (e.g., "genericwebsite.com") associated with a website of a vendor, and second information (e.g., "<company A>" and "<company B>") associated with a company. As further illustrated in FIG. 7, in an embodiment, the first and second information may be formatted differently for different candidate URLs. For example, in the candidate URL "https://genericwebsite.com/<company A>" the first information corresponds to a domain (e.g., the genericwebsite.com domain) of the first vendor, and the second information (e.g., the "/<company A>") corresponds to a directory within the domain of the vendor that is associated with the company A. As another example, in the candidate URL https://<company B>.genericwebsite.com the first information corresponds to the domain (e.g., the genericwebsite.com domain) of the first vendor, and the second information corresponds to a sub-domain within the domain of the vendor that is associated with the company B. As can be appreciated from the candidate URLs 710 illustrated in FIG. 7, the template generation module 220 may generate multiple candidate URLs (e.g., URL templates) comprising first information corresponding to a vendor's website, where different candidate URLs comprise different second information representing potential relationships between the vendor and different companies, such as company A and company B.

Referring back to FIG. 2, in an embodiment, the routine(s) of the template generation module 220 may generate templates automatically using a search engine. For example, the routine(s) may be configured to receive the initial data set as an input parameter, and may use the initial data set to generate one or more queries that may be provided to a search engine. An exemplary search engine query that may be generated by the template generation module 220 is illustrated in FIG. 7 as a search engine query 720. The search engine query 720 may query the search engine to return a list of all known websites (or URLs, uniform resource identifier (URIs), and the like) that contain the domain "genericwebsite.com" and that contain the keywords "signon," "sign on," "signin," "sign in," "login," "log in," "username" or "password." The URLs returned as a result of the search engine query 720 are limited to webpages within the domain "genericwebsite.com" that also contain one of the keywords following the "-inurl:" command of the search engine query 720 (e.g., "www," "www2," "www3," "support," "community," "developer," "developers," "help," "helpdesk," "blog," "forum," "forums," "wiki," or "https"). As a result of providing the search engine query 720 to a search engine, the template generation module 220 may receive a list of one or more candidate URLs that satisfy the search engine query 720. Such search results may correspond to a list of candidate URLs that may be used to identify relationships between a vendor (e.g., an owner of the domain "genericwebsite.com" and one or more companies. It is noted that other commands, syntaxes, keyword combinations, domains, and the like may be used by the template generation module 220 to generate search engine queries, and that the search engine query 720 is provided for purposes of illustration, rather than by way of limitation. Thus, the present disclosure is not to be limited to search queries of the exact structure shown in FIG. 7. In addition to automatically generating search engine queries, the template generation module 220 may be configured to provide a graphical user interface (GUI) that allows a user to customize, create, or otherwise edit search engine queries for use in generating a list of candidate URLs. In an embodiment, the user may access the GUI using the portal 160 of FIG. 1. As a result of the search engine query, a set of candidate URLs may be obtained or generated.

In an embodiment, the set of candidate URLs may include candidate URLs associated with different URL templates. For example, a first template may correspond to a domain and subdomain combination, such as the candidate URL "https://<company B>.genericwebsite.com" of FIG. 7, where the domain is "genericwebsite.com" and the subdomain is "<company B>" (e.g., the name of company B). As another example, the set of candidate URLs may include a second template corresponding to a domain and directory combination, such as the candidate URL "https://genericwebsite.com/<company A>" of FIG. 7, where the domain is "genericwebsite.com" and the directory is "<company A>" (e.g., the name of company A). It is noted that other structures of URL templates and candidate URLs may be generated by the template generation module 220, and the examples above are provided for purposes of illustration, rather than by way of limitation.

The template analysis module 230 may comprise one or more routines, executable by one or more processors (e.g., the CPU 161 of FIG. 1) to analyze the set of candidate URLs for various attributes, such as template frequency. For example, in an embodiment, the template analysis module 230 may analyze the set of candidate URLs. As a result of the analysis, the set of candidate URLs may be reorganized or collated such that all candidate URLs matching a particular template are grouped together. For example, as explained above, a first template may correspond to a domain of a first entity (e.g., a vendor) followed a directory associated with a second entity (e.g. a client of the vendor), as in the candidate URL "https://genericwebsite.com/<company A>" of FIG. 7, and a second template may correspond to a subdomain of a second entity (e.g., a client of a vendor) followed by a domain of the first entity (e.g., the vendor), as in the candidate URL "https://<company B>.genericwebsite.com" of FIG. 7. The template analysis module 230 may further analyze the set of candidate URLs to determine a count for each of the identified URL templates. For example, as shown at 730 of FIG. 7, the analysis may indicate that the set of candidate URLs included five candidate URLs (each associated with a different company) of the first template type (e.g., "https://genericwebsite.com/<company>") for a particular vendor (e.g., the owner of the domain "genericwebsite.com"), and may indicate that the set of candidate URLs included one thousand candidate URLs (each associated with a different company) of a second template type (e.g., https://<company>.my.salesforce.com) for another particular vendor. In an embodiment, the counts associated with each different identified candidate URL template/template type may be used to determine a cutoff point for exploring the template further. For example, in an embodiment, the template analysis module 230 may calculate a cutoff point for exploring a template further based on the total count of candidate URLs included in the set of candidate URLs as a fraction of the list S for the same template. In an embodiment, a low count for a particular URL template may indicate that the URL template is not valid, and candidate URLs matching the particular URL template may be discarded. In an embodiment, a high count for a particular URL template may indicate that the particular URL template is valid, and candidate URLs matching the particular URL template may be designated for further exploration and analysis, as described in more detail below. In an additional or alternative embodiment, the template analysis module 230 may comprise a routine (or subroutine) that implements machine learning algorithms to prune false positives from the set of candidate URLs. In an embodiment, the template analysis module 230 may provide a GUI that enables a human operator to review and/or approve/reject templates for further use in identifying relationships between a vendor and one or more companies.

In an embodiment, a threshold may be configured for use in determining whether a URL template count is indicative of an invalid URL template or a valid URL template. For example, if a count of ten or less candidate URLs for a particular URL template type indicates a high probability that the particular URL template is invalid, the threshold may be set to ten. Thus, any URL templates generated by the system 200 that have a count less than the threshold may be discarded as invalid. In an embodiment, the threshold may be set by a user of the system 200. In an additional or alternative embodiment, the threshold may be dynamically configured (e.g., by machine learning algorithms) based on historical data analysis associated with URL templates and candidate URLs. For example, when the system 200 is first operated, all URL templates may be determined to be valid, and may be explored, as described in more detail below. As a result of that analysis and exploration, the system 200 may generate historical URL template analysis information that identifies counts for various URL template and indicates whether URL templates having a particular count resulted in valid relationship information being obtained. Over time, this historical URL template analysis information may be used to dynamically configure the threshold. In an embodiment, each time a set of candidate URLs are generated for a new vendor (e.g., the first time that a vendor is associated with the first information), all templates may be counted, and explored irrespective of counts. This may be beneficial as an initial run to discover relationships for a new vendor (e.g., a vendor for which no relationship information has been previously discovered) because the potential scope in terms of relationships the new vendor may have is unknown. Thus, a relatively low count may still be indicative of a valid template, and should be explored to determine or configure the threshold for discarding URL templates. For example, if the new vendor is a startup company, the vendor may have a relatively low number of relationships. As time passes, the number of relationships the company has may increase as the vendor establishes new relationships. As this occurs, the threshold may be dynamically updated to increase threshold. Similarly, for existing vendors (e.g., vendors for which relationships have been previously discovered), the threshold may be dynamically adjusted up or down depending on whether the vendor is gaining or losing relationships. Exemplary techniques for discovering lost relationships are described in more detail below.

The template exploration module 240 may comprise one or more routines, executable by one or more processors (e.g., the CPU 161 of FIG. 1) to explore templates (e.g., analyze the candidate URLs) to determine whether a relationship exists between a vendor (e.g., an entity identified by the first information of a particular candidate URL) and a company (e.g., an entity associated with the second information of the particular candidate URL). In an embodiment, the template exploration module 240 may, as an initial matter, determine whether each candidate URL corresponds to a valid website for the vendor. For example, the template exploration module 240 may determine whether a particular candidate URL results in an error, results in a generic landing page, or results in a website of the vendor that includes information unique to the company associated the particular candidate URL's second information.

Referring briefly to FIG. 7, exemplary aspects of determining whether a candidate URL corresponds to a valid website for the vendor are shown as template exploration results 740. As shown in FIG. 7, the template exploration results 740 illustrate that a first candidate URL (e.g., "https://genericwebsite.com/<company A>") of a first URL template type (e.g., a URL template comprising vendor domain information and company directory information) results in a 404 error (e.g., an invalid website of the vendor), a second candidate URL (e.g., "https://genericwebsite.com/<company B>") resolves to a landing page with a generic logo (e.g., a logo of the vendor), and that a third candidate URL (e.g., "https://genericwebsite.com/<company C>") resolves in a landing page for a login with the logo of company C. Thus, under the initial analysis performed by the template exploration module, the second candidate URL and the third candidate URL may be determined to be associated with valid websites of the vendor (e.g., the owner of the "genericwebsite.com" domain).

In response to a determination that one or more candidate URLs correspond to valid websites of the vendor, the template exploration module 240 may analyze content of each valid website to determine whether the content includes information that is unique to the company identified by each corresponding candidate URL's second information. The presence of information that is unique to the first company within the content of a website of the vendor may indicate that a relationship exists between the company and the vendor. For example, the second candidate URL illustrated at 740 of FIG. 7, while resolving to a valid website of the vendor, only includes generic logo information. Thus, the template exploration module 240 may determine that the website corresponding to the second candidate URL does not suggest to within a threshold confidence level that a relationship exists between the vendor that owns the "genericwebsite.com" domain and company B. However, the third candidate URL illustrated at 740 of FIG. 7 resolves to a landing page (e.g., a valid website of the vendor) that includes content (e.g., company C's logo) that is uniquely associated with company C. Thus, the template exploration module 240 may determine that the website corresponding to the third candidate URL suggests to within the threshold confidence level that a relationship exists between the vendor that owns the "genericwebsite.com" domain and company C.

In an embodiment, the template exploration module 240 may further analyze the content of valid websites to determine where in the valid websites the content uniquely associated with a company is located. For example, when the content is located on a login page, this may more strongly suggest that a relationship exists than when information uniquely associated with the company is found within text in the body of the website. In an embodiment, the template exploration module 240 may store information representative of the type of content (e.g., logo, company name in text, redirect link, etc.) identified as unique to the company of interest, and the location of the content within the valid website at a database (e.g., the data storage 170 of FIG. 1). In an embodiment, this information may later be utilized (e.g., by the quality control analysis module 250) to assess the performance of the system 200 or weight the strength of the relationship, as described below in more detail. In an embodiment, the template exploration module 240 may analyze the content of the website through analysis of source code of the website, metadata associated with the website, analysis of image content included of the website, analysis of text content of the website, traversal of one or more links of the website to identify additional content of the website that should be analyzed, or a combination thereof.

In an embodiment, once a candidate URL and/or template is found that resolves to a valid website that includes content unique to a particular company, the template exploration module 240 may analyze or explore the template using additional company information. For example, if the initial set of candidate URLs for a particular template only included five candidate URLs for five different companies (e.g., five different companies selected from the list "S" and/or the list "T"), the template exploration module 240 may generate additional candidate URLs (or instruct the template generation module 220 to generate the additional candidate URLs) using additional company names (e.g., candidate URLs containing second information corresponding to companies that are different from the five different companies included in the initial set of candidate URLs), and may evaluate/analyze the additional candidate URLs in the manner described above to determine whether any of the additional candidate URLs correspond to a valid website that includes content unique to one of the additional companies. This may facilitate discovery of additional relationships that the vendor has. It is noted that a company may be both a vendor, and a client. Thus, in embodiments, some of the candidate URLs may include a particular company as a vendor (e.g., associated with the first information included in the candidate URL), while other candidate URLs may include the particular company as a client (e.g., associated with the second information included in the candidate URL).

The quality control analysis module 250 may comprise one or more routines, executable by one or more processors (e.g., the CPU 161 of FIG. 1) to evaluate the performance of the system 200. The performance of the system 200 may be evaluated to determine a likelihood that the relationships between vendors and companies, as identified by the system 200, are actual relationships (e.g., a likelihood that companies identified as having a relationship with a particular vendor, do actually have a relationship with that particular vendor, or are clients of that particular vendor). As briefly described above, the source for the content within a vendor's valid website that is unique to a company may provide some indication as to the reliability of that information. For example, the presence of the company's logo on a login page may strongly suggest that the relationship exists, whereas the presence of the company's name on the vendor's social media site, or within body text on the vendor's website may be deemed a weaker suggestion that the relationship exists. In an embodiment, the quality control analysis module 250 may analyze the information stored at the data storage by the template exploration module 240, and may flag relationships based on weak relationship indicators (e.g., relationships identified based on text only, or identified based on content of a social media site of the vendor). These flagged relationships may then be presented to a user via a GUI, and the user may verify whether the content is sufficient to support a conclusion that the company and the vendor have a relationship. In an additional or alternative embodiment, the quality control analysis module 250 may verify that content within a website that appears to be unique to the company identified by the second information, is in fact unique to the company. For example, it may be possible that some company information, such as company name acronyms, may lead to identification of ambiguous content. When ambiguous content associated with a company is identified, the quality control analysis module 250 may initiate operations to validate, or authenticate, the information (e.g., using one or more of the other data sources facilitated by the other data sources module 280). This may include seeking to corroborate the content by finding additional content from another source that suggests that the company included in the content of the valid website is in fact the company identified by the second information of the corresponding candidate URL, and that corroborates the existence of the relationship between the vendor and the company.

The relationship analysis module 260 may comprise one or more routines, executable by one or more processors (e.g., the CPU 161 of FIG. 1), to analyze the results of the template exploration results output by the template exploration module 240 to generate relationship information. For example, and referring briefly to FIG. 7, as a result of the template exploration performed by the template exploration module 240, a vendor client list 750 may be generated. The vendor client list 750 may identify various companies that were identified as clients of a vendor through analysis of one or more valid websites of the vendor. For example, each of the clients identified in the vendor client list 750 may have been identified by detecting the presence of content unique to each of the clients in one or more valid websites of the vendor (e.g., company A in this example). Once a vendor client list 750 has been created, the graph may be reversed to plot all of the vendors for a particular client. This may result in a list of companies and clients 760, as shown in FIG. 7. In an embodiment, as a result of the analysis of the relationships between companies and vendors, the relationship analysis module 260 may generate relationship information 262. In an embodiment, the relationship information 262 may be stored in a database, such as the data store 170 of FIG. 1. In an embodiment, the relationship analysis module 260 may be configured to identify multiple relationships between a vendor and particular company. For example, a vendor (e.g., Google®) may provide e-mail services (e.g., Gmail®), cloud data hosting services (e.g., Google Drive™), analytics services (e.g., Google Analytics™), etc. The system 200 of embodiments may facilitate discovery of multiple relationships between a single client and the vendor through discovery of one or more services of the vendor that are used by the client. Such information may provide a further indication that a relationship exists between the client and the vendor. In an additional or alternative embodiment, the relationship information 262 may be provided to the weighting module 270 for use in weighting the relationship between the vendor and one or more clients of the vendor. In an embodiment, graphs (e.g., the vendor client list 750 and the list of companies and clients 760) may be generated by the routine(s) of the relationship analysis module 260. These graphs may depict organizational interactions between various corporate entities, and may be used to generate alternative representations of an internet ecosystem. Exemplary alternative representations of internet ecosystems are illustrated with reference to FIGS. 3-5, which are described in more detail below In an embodiment, the additional data sources module 280 may comprise one or more routines, executable by one or more processors (e.g, the processor 161 of FIG. 1), to analyze other data sources for information indicating the existence of a relationship between a company and a vendor. These other data sources may include information obtained through source code analysis of one or more websites of a vendor for indications that a particular company is a client of the vendor, information obtained through social media sites, information obtained through analysis of the vendor's press releases, information obtained from hosting service and infrastructure providers, and/or information obtained through network analysis (e.g., content delivery networks (CDNs) and objects embedded in web pages, such as Ad providers). Information that may be obtained through source code analysis may include detection of the presence of icons associated with a particular company within a website of the vendor, for example. Network analysis may be used to deduce, with high accuracy, a vendor's network devices and network providers. For example, by taking snapshots of portions of the Internet, and then applying searches for specific device fingerprints within the network footprint of a company, the presence of signatures and patterns for fingerprints known to be associated with a particular firewall hardware/software provider, such as Cisco. This could be a strong indicator that the particular firewall hardware/software provider is a vendor to the company. Additional information that may be obtained through network analysis may include, but is not limited to, secure socket layer (SSL) certificates, content delivery networks, internet service providers, hosting providers, e-mail service providers, hardware providers, self-hosted vendor subdomains, and the utilization of one or more payment providers.

Social media site and job posting site analysis may be used to analyze information that employees of a company post within the social media profiles or job posting sites that may indicate a relationship between the employer and one or more vendors. For example, if a person working for a particular company posts a particular technology (e.g., SQL Server®) was used at their job, it can be deduced that the particular company has Microsoft as a vendor (e.g., because SQL Server® is a product produced by Microsoft). In an embodiment, frequency analysis may be performed in connection with such information to increase the reliability of any relationships determined from such information. For example, if a high percentage of people working at a particular company indicate that a particular technology is used at their job, this may more strongly suggest that their employer has a client/vendor relationship with the provider/manufacturer of the particular technology. Additionally, analysis of press releases may reveal information about various relationships that an entity has with one or more third party vendors.

The weighting module 270 may comprise one or more routines, executable by a processor (e.g., the processor 161 of FIG. 1) for weighting discovered relationships, where the weight of a relationship may indicate the relationship strength, a risk factor associated with the relationship, or a combination thereof. In an embodiment, the relationships may be weighted based on a number of connections between a client and a vendor. For example, if the client has numerous relationships with a vendor (e.g., a relationship relating to cloud services of the vendor, a relationship relating to e-mail services provided by the vendor, etc.), that relationship may be assigned a higher weight than a relationship where the client has a single relationship with the vendor. This is because relationships between a client and a vendor based on multiple connections may indicate that the two entities are more closely integrated than relationships based on a single connection. In an embodiment, described in more detail below with reference to FIG. 8, the weighting module 270 may be configured to assign weights to discovered relationships based on characteristics of the relationship. In an additional or alternative embodiment, the weights applied to various relationships may be based on more than just the relationships/number of relationships. For example, is a large percentage of employees of a company indicate (e.g., in a social media profile) that they use a particular technology corresponding to a particular vendor, this may indicate a strong relationship between the employer and the particular vendor. In an embodiment, information representative of the weights applied to various relationships may be generated by the weighting module 270, and may be output as weighted relationship information 272. In an embodiment, the weighted relationship information 272 may be stored in a database, such as the database 170 of FIG. 1.

To date, relationship information, such as the information obtained using the techniques of the system 200 described above, has not been easily accessible, and thus, organizational relationships determined according to embodiments of the present disclosure may provide a higher degree of accuracy with respect to organizational relationships. This is because traditional techniques primarily utilized analysis of website source code, but such analysis did not often turn up information indicating the existence of a relationship between a vendor and a company, and often resulted in obtaining only a small fraction of the relationships identified according to embodiments of the system 200. Thus, embodiments of the present disclosure improve the functioning of relationship servers, such as the relationship server 110 of FIG. 1, by increasing the accuracy of the discovered relationships. Additionally, it is noted that the techniques utilized by the various routines of the system 200 are all non-intrusive, and are not dependent upon an particular vendor providing information regarding its clients, or a particular company providing information regarding its vendors. Thus, the system 200 may operate autonomously, providing the ability to monitor the corporate interaction and relationship ecosystem using the techniques described above to maintain real-time information about the organizational relationships for various companies.

In some embodiments, the system 200 may be configured to periodically refresh the relationship information. This refreshing of the relationship information may be further analyzed to discover various types of information. For example, periodically updating the relationship information may facilitate tracking the growth of companies, such as when a company is adding new relationships (e.g., relationships with new clients, or additional relationships/connections with existing clients), or the decline of companies, such as when a company is losing relationships faster than the company is adding new relationships. This may facilitate competitive market analysis (e.g., how a company is doing relative to its competitors). As another example, the refreshing of the relationship information may facilitate analysis of the health of the Internet ecosystem as discovered by the system 200 (e.g., are particular market segments adding relationships, which is a sign of good health for that segment of the Internet ecosystem, or losing relationships, which would indicate poor health for that segment of the Internet ecosystem). It is noted that the various uses for the relationship information provided herein have been provided for purposes of illustration, rather than by way of limitation, and the relationship information generated according to embodiments of the present disclosure may be used for many other purposes without departing from the scope of the present disclosure.

Figure 3:
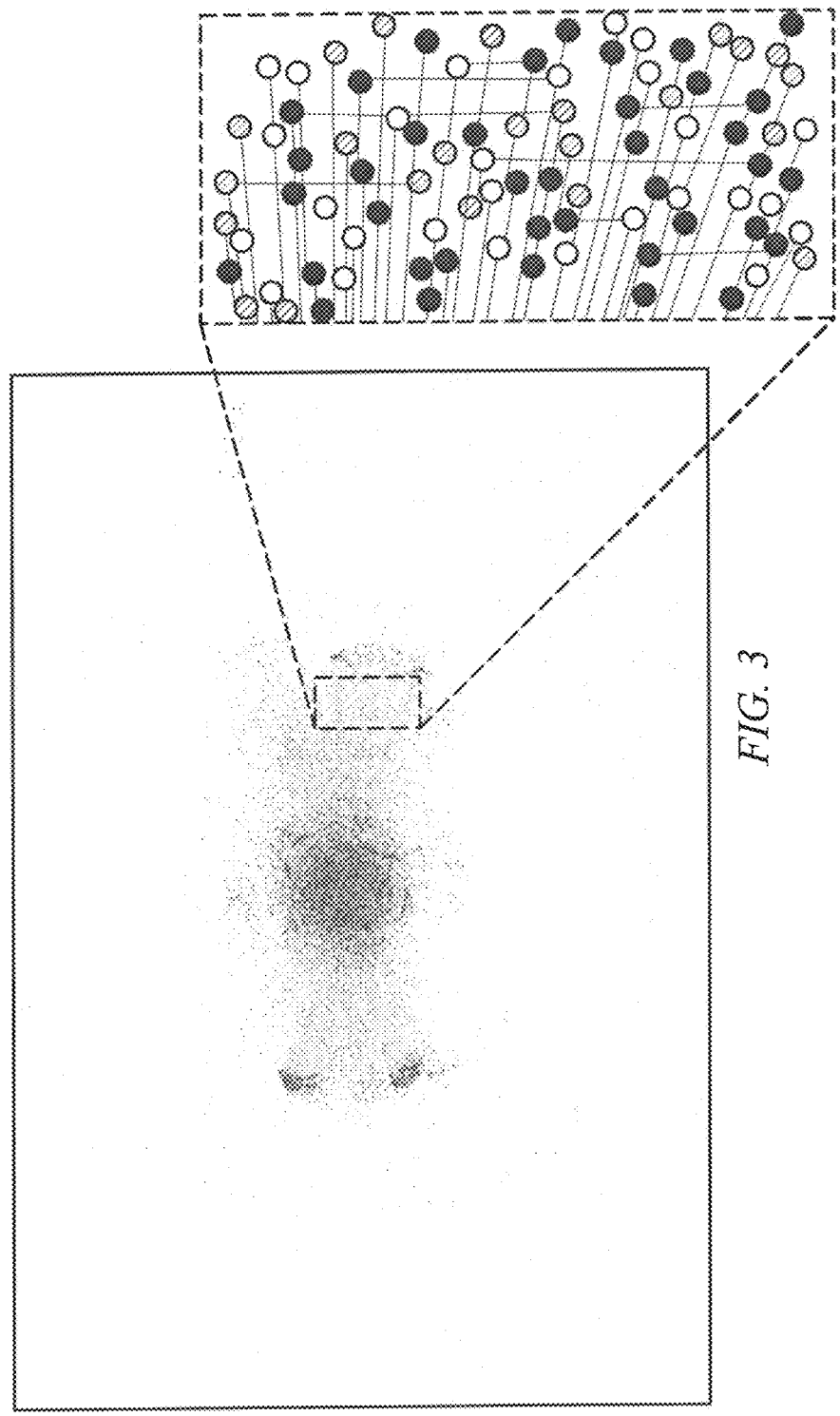
FIG. 3 is a model illustrating organizational relationship information captured according to an embodiment.

Referring to FIG. 3, a model illustrating relationship information captured according to an embodiment is shown. In FIG. 3, a subset of an ecosystem of companies in the United States is shown. Each of the dots in the model corresponds to a company operating in the United States, and lines between dots represent the existence of a relationship (e.g., a business relationship, a customer/vendor relationship, etc.) between the companies corresponding to the corresponding dots.

Figure 4:
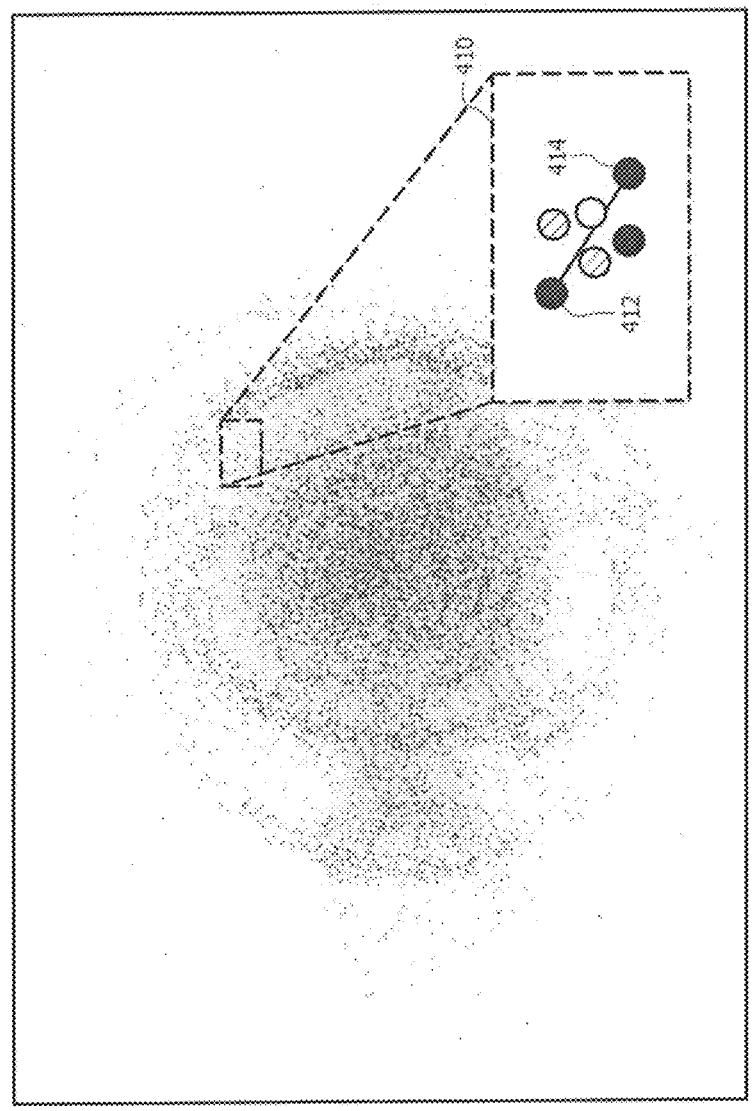
FIG. 4 is another model illustrating additional organizational relationship information captured according to an embodiment.

Referring to FIG. 4, another model illustrating additional relationship information captured according to an embodiment. In FIG. 4, a cloud of companies is shown, and illustrates connections between 30,000 entities with 60,000 links (which is a subset of the entire database). The insert 410 displays a few nodes of the model that correspond to different companies, and illustrates that of the 6 entities in the insert 410, only the entities 412 and 414 have a relationship between them. In this particular example, the relationship is a client/vendor relationship based on software services (e.g., between cnn.com and slack.com). It is noted that the different grey scales may symbolize the security posture and/or other features of the entities. For example, the dark grey colors associated with the entities 412, 414 may indicate a strong security posture (e.g., good level of cybersecurity), the two intermediate shades of grey closest to the entity 412 may indicate an average security posture (e.g, a medium level of cybersecurity), and the lighter shade of grey entity closest to the entity 414 may indicate a poor security posture (e.g., low level of cybersecurity).

Figure 5:
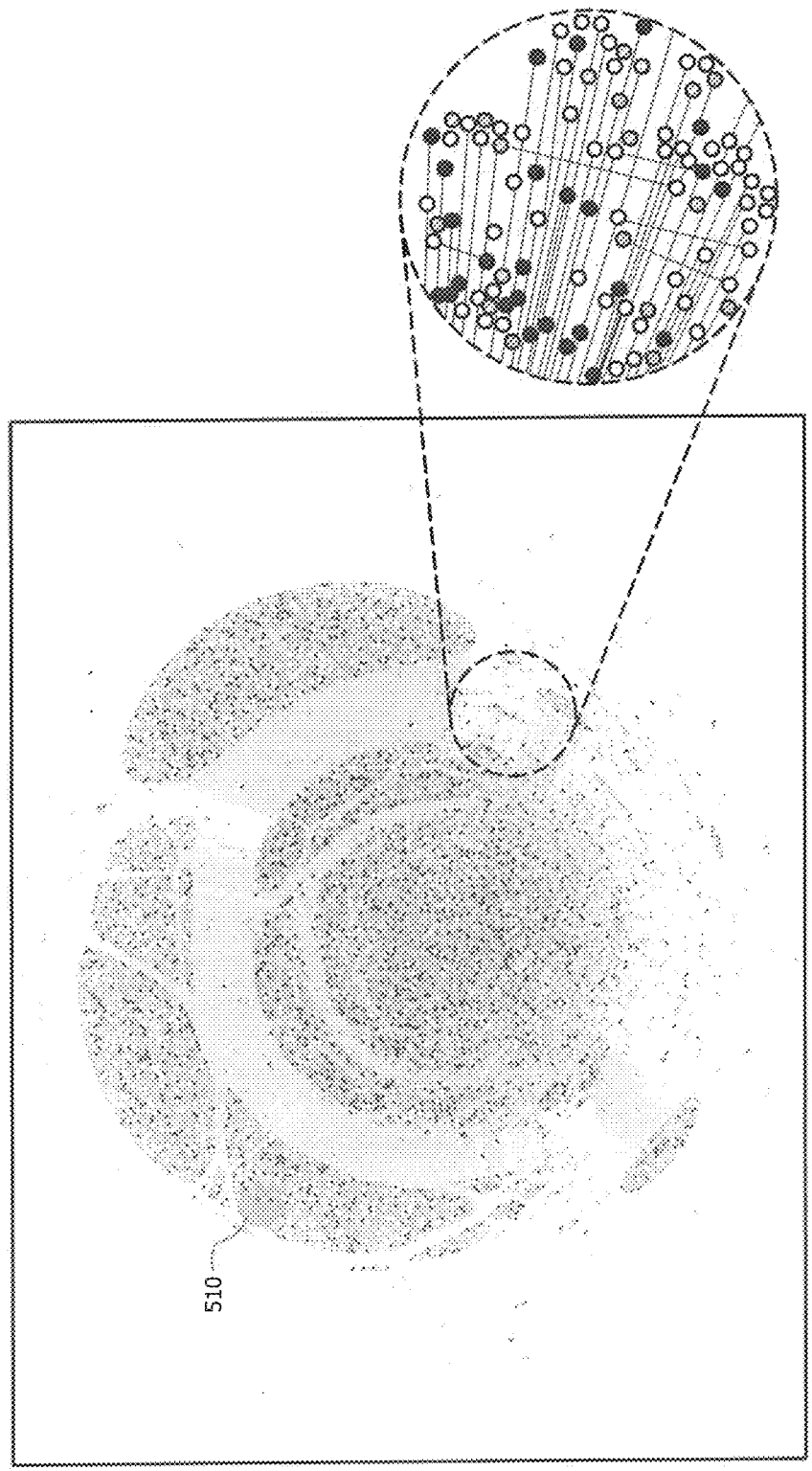
FIG. 5 is yet another model illustrating organizational relationship information captured according to an embodiment.

Referring to FIG. 5, yet another model illustrating relationship information captured according to an embodiment is shown. In FIG. 5, the model illustrates companies and their connections (e.g., relationships) with security rankings represented as different shades of grey. The black dots correspond to entities having a poor security posture (e.g., a low level of cybersecurity), the dark grey dots correspond to entities having a good security posture (e.g., a high level of cybersecurity), and other shades of grey indicating other security postures (e.g., levels of cybersecurity that are between the high and low levels of cybersecurity). The grey lines illustrate how the various companies are connected via client/vendor relationships. The big dot 510 corresponds to a particular entity of interest, which, in this graph, represents www.cnn.com.

Figure 6:
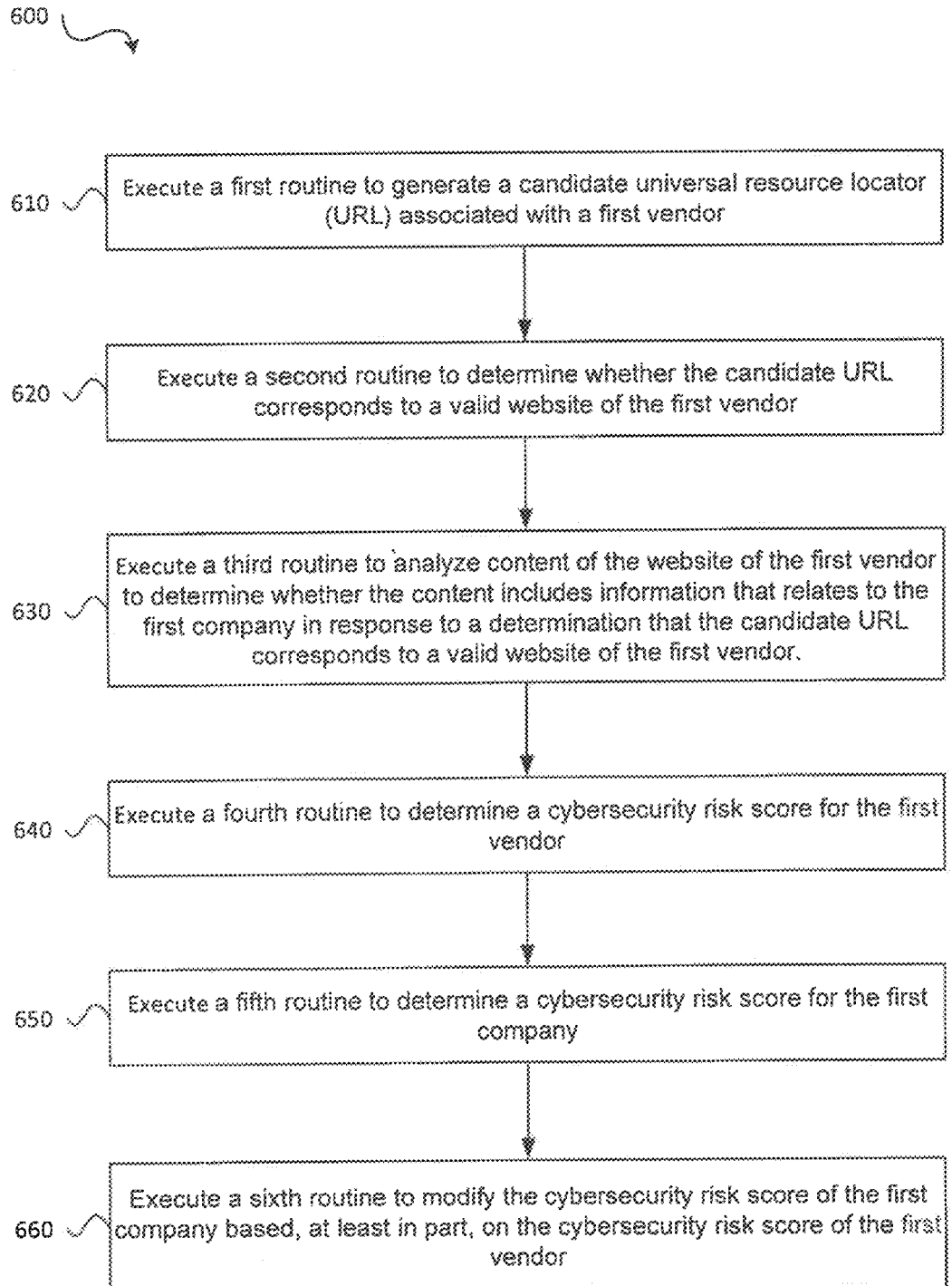
FIG. 6 is a flow diagram of a method for determining a cybersecurity score of a first company based on a cybersecurity posture of one or more vendors that have a relationship with the first company through analysis of content of one or more vendor websites containing information that is unique to the first company according to an embodiment.

FIG. 6 is a flow diagram of a method for determining a cybersecurity score of a first company based on a cybersecurity posture of one or more vendors that have a relationship with the first company through analysis of content of one or more vendor websites containing information that is unique to the first company according to an embodiment is shown as a method 600. In an embodiment, the method 600 may be stored in a computer-readable storage medium as instructions that, when executed by one or more processors, cause the one or more processors to perform the operations of the method 600. In an embodiment, the method 600 may be performed by the relationship server 110 of FIG. 1, by the system 800 of FIG. 8, or a combination thereof.

At 610, the method 600 includes executing a first routine to generate a candidate universal resource locator (URL) associated with a first vendor. In an embodiment, the first routine may correspond to the routine of the template generation module 220 of FIG. 2. The candidate URL may comprise first information corresponding to a website associated with the first vendor and second information associated with the first company, and the first vendor and the first company are different. In an embodiment, the candidate URL may be generated using a search engine query, such as the search engine query 720 of FIG. 7, as described above with reference to FIG. 2.

At 620, the method 600 includes executing a second routine to determine whether the candidate URL corresponds to a valid website of the first vendor, and, at 630, executing a third routine to analyze content of the website of the first vendor to determine whether the content includes information that is unique to the first company in response to a determination that the candidate URL corresponds to a valid website of the first vendor. In an embodiment, the second routine and/or the third routine may correspond to one or more of the routines described in connection with the template analysis module 230 and the template exploration module 240 described in connection with FIG. 2, and may generate information similar to the candidate URL analysis 730 and/or the template exploration results 740 described with reference to FIG. 7. In an embodiment, the presence of information that is unique to the first company within the content of the website of the first vendor may indicate that a relationship exists between the first company and the first vendor.

At 640, the method 600 may include executing a fourth routine to determine a cybersecurity risk score for the first vendor, and, at 650, executing a fifth routine to determine a cybersecurity risk score for the first company. In an embodiment, the fourth routine and the fifth routine may correspond to the routine described in connection with the scoring module 810 of FIG. 8. In an embodiment, the cybersecurity risk scores calculated by the fourth and fifth routines may only account for the individual cybersecurity level of the first vendor and the first company, respectively, and may not account for how any relationships between the first vendor and the first company affect the aggregate cybersecurity risk of the respective entities.

At 660, the method 600 includes executing a sixth routine to modify the cybersecurity risk score of the first company based, at least in part, on the cybersecurity risk score of the first vendor. In an embodiment, the sixth routine may correspond to one or more of the routines described in connection with the weighting module 270 of FIGS. 2 and 8, and the scoring module 810 of FIG. 8. In an embodiment, the modification may reflect that the cybersecurity of the first company is dependent upon the cybersecurity of the first vendor by virtue of the relationship between the first company and the first vendor.

Figure 8:
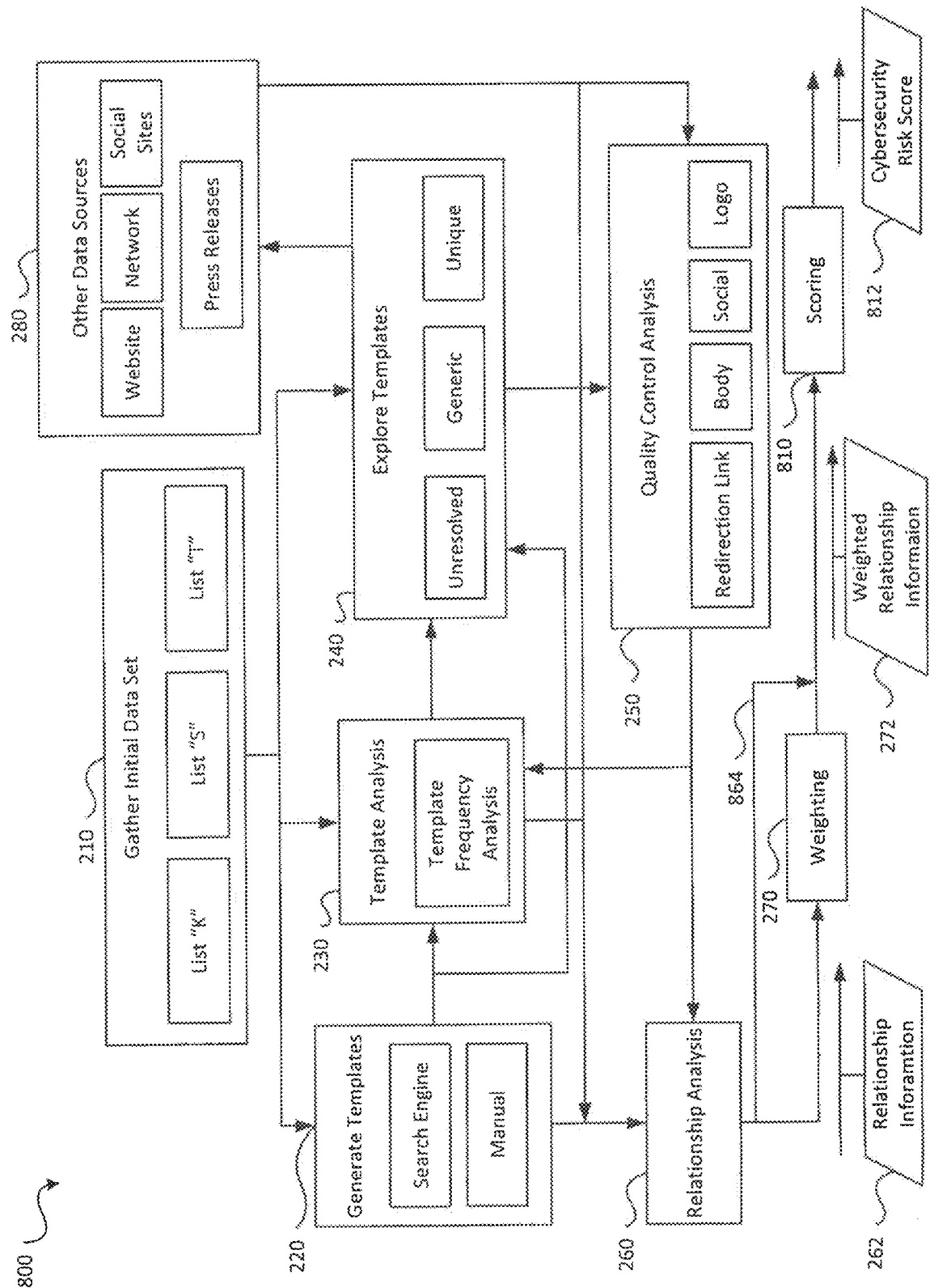
FIG. 8 is a block diagram of a system for calculating an entity's cybersecurity risk score based on discovered organizational relationships according to an embodiment.

Referring to FIG. 8, a block diagram of a system for calculating an entity's cybersecurity risk score based on discovered organizational relationships according to an embodiment is shown as a system 800. As shown in FIG. 2, the system 800 includes the gather initial data set module 210, the template generation module 220, the template analysis module 230, the template exploration module 240, the quality control analysis module 250, the relationship analysis module 260, the weighting module 270, and the additional data sources module 280 of FIG. 2. Additionally, the system 800 includes a scoring module 810. The scoring module 810 may be configured to calculate a cybersecurity risk score for an entity based, at least in part, on relationships discovered according to the techniques described above with reference to FIG. 2, as described below.

The scoring module 810 may comprise one or more routines, executable by one or more processors (e.g., the CPU 161 of FIG. 1) to calculate a cybersecurity risk score for each of the various entities identified by the system 800. In an embodiment, the cybersecurity risk score for a particular entity may be calculated at an arbitrary time (e.g., upon the system 800 learning of the existence of the particular entity, such as when the particular entity is added to the list "T" by the gather initial data set module 210. Subsequently, and in response to a determination that the content of the website of a vendor includes information that is unique to the particular entity (e.g., that a relationship exists between the vendor and the particular entity), the scoring module may determine whether to modify the cybersecurity risk score of the particular entity based, at least in part, on the cybersecurity risk score of the vendor. The modification may reflect that the cybersecurity of the particular entity may be dependent upon the cybersecurity of the vendor (e.g., because of the relationship between the particular entity and the vendor). Due to the periodic modification of a company's cybersecurity risk score based on the relationships that each company has, a company that has a good cybersecurity risk score when considered individually, may have a lower score when considered in view of its various vendor/client relationships (e.g., because one or more of the vendors that the company has a relationship with may have poor cybersecurity). Such information (e.g., relationship information, and cybersecurity risk scores that have been adjusted to account for the security posture of vendors having a relationship with a vendor) may be important to various entities, such as entities that insure companies against losses and out of pocket expenses caused by cybersecurity breaches. In an embodiment, the degree to which the cybersecurity risk score is modified or adjusted may reflect the level of cybersecurity for various tiers of vendors/clients.

In an embodiment, the weighted relationship information 272 generated by the weighting module 270, as described with reference to FIG. 2, may be used to dynamically adjust cybersecurity risk scores for various entities. For example, the strength of the relationship, as indicated by the weight applied to the relationship information by the weighting module 270, may be used to determine the degree to which a cybersecurity risk score is adjusted up or down based on a relationship. For example, a strong relationship (e.g. high weight) may cause the cybersecurity risk score to adjusted up or down to a higher degree than a weak relationship (e.g., low weight).

In an embodiment, the weighting module 270 may be further configured to determine the weight of a relationship based on risk factors, and the scoring module 810 may generate a cybersecurity score based on the risk factors. In an embodiment, the risk factor(s) may represent the affect that, or degree to which, a breach of the vendor's cybersecurity will expose sensitive data of the company being scored. For example, if the relationship is between a company and a cloud data storage provider, a breach of the cloud storage provider's systems may expose some or all of the data stored in the cloud by the company. In such instances, the weighting module 270 may determine that a breach of the vendor's cybersecurity may potentially expose sensitive data of the company being scored, and may give that relationship more weight. Based on the risk factor(s), the weighting module 270 may determine the weight of the relationship, and scoring module 810 may modify or adjust the cybersecurity score of the company based, at least in part, on the weighting of the relationship. Thus, the weighting may account for, or indicate the risk level indicated by the risk factor. For example, in the scenario above, the risk factor may indicate a high risk level because the company is storing information at the cloud offered by the vendor, and a compromise of the vendor may result in a breach of information that the company may has stored within the cloud. If the cybersecurity risk score for the vendor is low and the risk factor indicates a high risk level, the weighting of the relationship may result in a lower cybersecurity risk score for the company. If the cybersecurity risk score for the vendor is high, the weighting factor may result in no change or only a slight decrease to the cybersecurity score of the company. In an embodiment, the risk factors and weights may be stored at the data storage 170 of FIG. 1. Such information may be used to monitor and identify trends in cybersecurity levels of various entities. It is noted that in some embodiments, the cybersecurity risk score for a company may be increased or decreased based on relationships that the company has with many different vendors. In an embodiment, the relationships from which the cybersecurity risk score is modified or adjusted may be direct relationships (e.g., when the company is a direct client of the vendor), indirect relationships (e.g., when the company utilizes a vendor, and the vendor in turn utilizes another vendor to provide the service/solution to the company), or a combination thereof. As a result of the modifications or adjustment to the cybersecurity risk score of the company, a cybersecurity risk score 812 may be generated and stored in the database (e.g., the data storage 170 of FIG. 1).

The cybersecurity risk score 812 may be provided to a third party that may be interested in the aggregate cybersecurity risk for a company (e.g., the cybersecurity risk of the company, as may be impacted by the company's relationships, whether direct or indirect, with one or more vendors). For example, when an insurance provider is assessing the cybersecurity risk of a company in connection with underwriting an insurance policy covering costs associated with breaches of information security, the insurance provider may desire to consider how any vendors that the potential insured company has relationships with, as those relationships may change how the insurance company views the cybersecurity risk of the company. For example, if the potential insured has a high level of cybersecurity, but exchanges and stores data with several vendors who have a low level of cybersecurity, the aggregate cybersecurity risk of the potential insured may be higher (e.g., greater risk) than the cybersecurity risk of the potential insured alone.

In some embodiments, the system 800 may be configured to periodically refresh the relationship information. For example, after a threshold period of time has elapsed, the system 800 may capture another snapshot of relationships between various entities using the techniques described above. This may allow the system 800 to keep the cybersecurity risk scores up-to-date with the most recent set of relationship information for each entity included in the analysis. For example, when a first snapshot is taken and the cybersecurity risk scores are calculated, a first company may have a relationship with a first vendor having poor cybersecurity, which may negatively impact the aggregate cybersecurity risk score for the first company, as described above. However, a second snapshot may be captured after some threshold time period has elapsed since the first snapshot was taken, and the information captured in the second snapshot may indicate that the first company no longer has a relationship with the first vendor, and instead has a new relationship with a second vendor having a good cybersecurity posture, which may result in the weighting and scoring modules modifying or adjusting the aggregate cybersecurity risk score for the first company to indicate an improved or higher level of cybersecurity (e.g., an improved cybersecurity risk score), and lower cybersecurity risk. In an additional or alternative embodiment, the scoring module 810 may be configured to determine the cybersecurity risk score for various entities without applying weights to the relationship information, as indicated by the arrow 864. Using relationship information, whether weighted or unweighted, to determine an entity's cybersecurity risk score may improve the accuracy of the cybersecurity risk scores by accounting for how those relationships impact the cybersecurity of the entity being scored. Thus, embodiments of the present disclosure improve the functioning of a computer programmed to determine cybersecurity risk score, and improve the technical field of assessing cybersecurity risks associated with entities. In an embodiment, the scoring module 810 may be configured to determine, at least in part, cybersecurity scores using one or more of the techniques described in commonly-owned and co-pending U.S. patent application Ser. No. 14/702,661, entitled "CALCULATING AND BENCHMARKING AN ENTITY'S CYBERSECURITY RISK SCORE," the contents of which are incorporated herein by reference in its entirety, and then weight an entity's cybersecurity score based on the weighted relationship information and cybersecurity risk scores of the entities having relationships with the entity.

Figure 9:
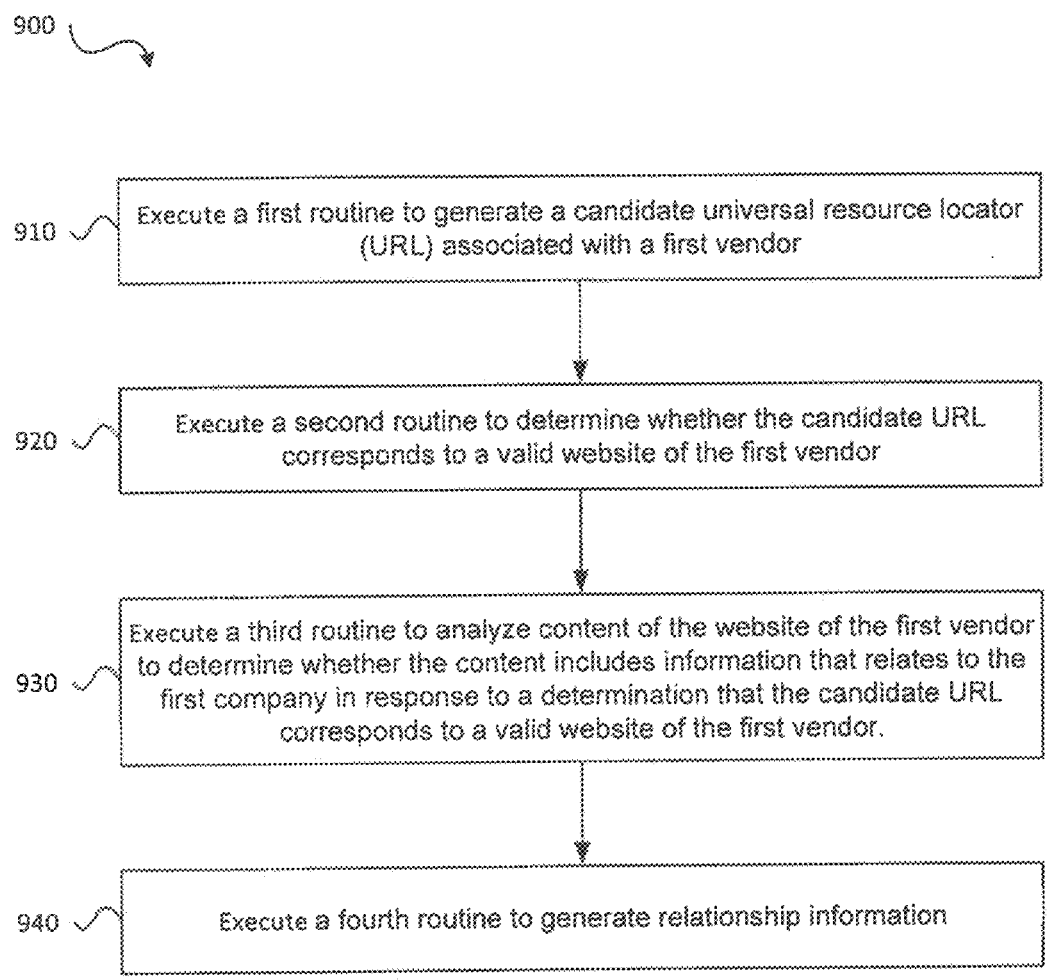
FIG. 9 is a flow diagram of a method for non-intrusively discovering relationships between organizations according to embodiments.

Referring to FIG. 9, a flow diagram of a method for non-intrusively discovering relationships between organizations according to embodiments is shown as a method 900. In an embodiment, the method 600 may be stored in a computer-readable storage medium as instructions that, when executed by one or more processors, cause the one or more processors to perform the operations of the method 600. In an embodiment, the method 600 may be performed by the relationship server 110 of FIG. 1, by the system 200 of FIG. 2, or a combination thereof.

At 910, the method 900 includes executing, by one or more processors, a first routine to generate a candidate universal resource locator (URL) associated with a first vendor. In an embodiment, the candidate URL may comprise first information corresponding to a website associated with the first vendor and second information associated with the first company, where the first vendor and the first company are different, as described with reference to FIG. 2. At 920, the method 900 includes executing, by the one or more processors, a second routine to determine whether the candidate URL corresponds to a valid website of the first vendor, and, in response to a determination that the candidate URL corresponds to a valid website of the first vendor, the method 900 may include, at 930, executing, by the one or more processors, a third routine to analyze content of the website of the first vendor to determine whether the content includes information that relates to the first company. In an embodiment, the presence of information that relates to the first company within the content of the website of the first vendor may indicate a relationship between the first company and the first vendor. At 940, the method 900 includes generating relationship information. In an embodiment, the relationship information may be the relationship information 262 described with reference to FIG. 2, or may be the weighted relationship information 272 of FIG. 2. In an embodiment, the relationship information may be stored in a database, such as the data store 170 of FIG. 1.

In an additional or alternative embodiment, the relationship information may be used to determine various other types of information associated with the first company and/or the first vendor, such as whether the first company or first vendor is adding new relationships, losing relationships, etc., as described above with reference to FIG. 2. The operations of the method 900 for discovering organizational relationships may be performed in a non-intrusive manner. In an embodiment, additional data sources and techniques may be used to validate or otherwise confirm the relationship, such as using the quality control analysis module 250 and the other data sources module 280 of FIG. 2.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for adjusting a cybersecurity risk score of a first company based on a cybersecurity posture of one or more vendors, the method comprising:
    non-intrusively searching, by one or more processors, for information that is indicative of a relationship between the first company and the one or more vendors;
    combining first information corresponding to a website attributable to a first vendor of the one or more vendors and second information corresponding to the first company to generate a candidate universal resource locator (URL), where the first vendor and the first company are different entities; and
    determining if the candidate URL resolves to a website of the first vendor;
    in response to the candidate URL resolving to a valid website of the first vendor:
        determining a cybersecurity posture for the first vendor; and
        adjusting, by the one or more processors, a cybersecurity risk score of the first company based, at least in part, on the determined cybersecurity posture for the first vendor; and
        outputting, subsequent to the adjusting, the adjusted cybersecurity risk score of the first company to a graphical user interface.

2. The method of claim 1, where the first information corresponds to a domain of the website attributable to the website of the first vendor and the second information is combined with the first information as a subdomain of the domain of the first vendor.

3. The method of claim 1, where the first information corresponds to a domain of the website attributable to the first vendor and the second information is combined with the first information as a directory within the domain of the first vendor.

4. The method of claim 1, where determining, by the one or more processors, if the candidate URL resolves to the website attributable to the first vendor comprises one or more of analyzing: source code of the website, image content included of the website, or text content of the website.

5. The method of claim 1, further comprising:
    identifying additional services used by the first company and that are offered by additional vendors that are different from the first vendor based on other information sources, where the other information sources comprise one or more of network footprints of one or more of the additional vendors, social network information, and press release information for one or more of the additional vendors.

6. The method of claim 1, method further comprising:
    determining a risk factor based on the use, by the first company, of a service offered by the first vendor, where the risk factor represents a risk that a breach of the first vendor's cybersecurity will expose sensitive data of the first company; and
    determining a weighting factor associated with the risk factor, where the cybersecurity risk score of the first company is adjusted based, at least in part, on the risk factor and the weighting factor.

7. The method of claim 1, further comprising:
    identifying one or more additional vendors that are different from the first vendor and that offer additional services that are used by the first company;
    determining cybersecurity postures for each of the one or more additional vendors; and
    adjusting the cybersecurity risk score of the first company based, at least in part, on the cybersecurity postures determined for each of the one or more additional vendors.

8. The method of claim 1, further comprising:
    generating a graph that depicts relationships between the first company and the first vendor and between the first company and each of one or more additional vendors, where a relationship between the first company and a particular vendor, as depicted by the graph, indicates that the first company uses a service of the particular vendor.

9. The method of claim 1, further comprising:
    in response to the determination that the candidate URL resolves to the website of the first vendor, generating, by the one or more processors, a plurality of additional candidate URLs, where each of the plurality of additional candidate URLs comprises the first information and different second information, and where the different second information corresponds to a particular company that is different from the first company;
    determining:
        if one or more candidate URLs of the plurality of additional candidate URLs resolves to the website attributable to the first vendor; and
        if at least one validated candidate URLs of the plurality of additional candidate URLs resolves to the website attributable to the first vendor, adjusting, by the one or more processors, cybersecurity risk scores for each of one or more additional companies associated with validated candidate URLs of the plurality of additional candidate URLs based on the cybersecurity posture of the first vendor to produce an adjusted cybersecurity risk score for each of the one or more additional companies.

10. The method of claim 1, further comprising:
    in response to the determination that the at least one candidate URL resolves to the website the website attributable to the first vendor, generating by the one or more processors, a plurality of additional candidate URLs, where each of the plurality of additional candidate URLs comprises different first information and the second information, and where, for each of the plurality of additional candidate URLs, the different first information corresponds to a vendor other than the first vendor;
    determining if one or more candidate URLs of the plurality of additional candidate URLs resolves to a website of a particular vendor other than the first vendor, and when at least one candidate URL of the plurality of additional candidate URLs resolves to a website of a particular vendor:

determining, by the one or more processors, a cybersecurity posture for each particular vendor associated with one of at least one validated candidate URLs of the plurality of additional candidate URLs; and adjusting, by the one or more processors, the cybersecurity risk score of the first company based, at least in part, on the cybersecurity posture for each particular vendor.

11. A non-transitory computer-readable storage medium storing instructions that, when executed by one or more processors, cause the one or more processors to perform operations comprising:

non-intrusively searching for information that is indicative of a relationship between a first company and one or more vendors;

combining first information corresponding to a website attributable to a first vendor of the one or more vendors and second information corresponding to the first company to generate a candidate universal resource locator (URL), where the first vendor and the first company are different entities; and in response to the candidate URL resolving to a valid website of the first vendor:

determining a cybersecurity posture for the first vendor; and adjusting a cybersecurity risk score of the first company based, at least in part, on the cybersecurity posture for the first vendor; and outputting, subsequent to the adjusting, the adjusted cybersecurity risk score of the first company to a graphical user interface.

12. The non-transitory computer-readable storage medium of claim 11, where the first information corresponds to a domain of the website attributable to the first vendor and the second information is combined with the first information as a subdomain of the domain of the website attributable to the first vendor.

13. The non-transitory computer-readable storage medium of claim 11, where the first information corresponds to a domain of the website attributable to the first vendor and the second information is combined with the first information as a directory within the domain of the first vendor.

14. The non-transitory computer-readable storage medium of claim 11, the operations further comprising:

identifying additional services used by the first company and that are offered by additional vendors that are different from the first vendor based on other information sources where the other information sources comprise one or more of network footprints of one or more of the additional vendors, social network information, and press release information for one or more of the additional vendors.

15. The non-transitory computer-readable storage medium of claim 11, the operations further comprising:

determining a risk factor based on the use, by the first company, of a service offered by the first vendor, where the risk factor represents a risk that a breach of the first vendor's cybersecurity will expose sensitive data of the first company; and determining a weighting factor associated with the risk factor, where the cybersecurity risk score of the first company is adjusted based, at least in part, on the risk factor and the weighting factor.

16. A system for adjusting a cybersecurity risk score of a first company based on a cybersecurity posture of one or more vendors that have a relationship with the first company through non-intrusive analysis of content of one or more vendor websites containing information that relates to the first company, the system comprising:

a memory; and one or more processors coupled to the memory, the one or more processors configured to:

non-intrusively search for information that is indicative of a relationship between the first company and the one or more vendors;

combine first information corresponding to a website attributable to a first vendor of the one or more vendors and second information corresponding to the first company to generate a candidate universal resource locator (URL), where the first vendor and the first company are different entities;

determine if the at least one candidate URL resolves to the website of the first vendor; and in response to the at least one candidate URL resolving to the website of the first vendor:

obtain information indicative of a cybersecurity posture for the first vendor; and adjust a cybersecurity risk score of the first company based, at least in part, on the information indicative of the cybersecurity posture for the first vendor; and output, subsequent to the adjusting, the adjusted cybersecurity risk score of the first company to a graphical user interface.

17. The system of claim 16, where the first information corresponds to a domain of the website attributable to the website of the first vendor and the second information corresponds is combined with the first information as a subdomain within the domain of the first vendor.

18. The system of claim 16, where the first information corresponds to a domain of the website attributable to the first vendor and the second information is combined with the first information as a directory that is associated with the first company and is within the domain of the first vendor.

19. The system of claim 16, where the one or more processors are configured to determine if the at least one candidate URL resolves to the website attributable to the first vendor by analyzing if the at least one candidate URL resolves to a website of the first vendor via analysis of source code of the website, image content included of the website, text content of the website, or a combination thereof.

20. The system of claim 16, where the one or more processors are further configured to:

identify additional services used by the first company and that are offered by additional vendors that are different from the first vendor based on other information sources, where the other information sources comprise one or more of network footprints of one or more of the additional vendors, social network information, and press release information for one or more of the additional vendors.

21. The system of claim 16, where the one or more processors are further configured to:

determine a risk factor based on the use, by the first company, of a service offered by the first vendor, where the risk factor represents a risk that a breach of the first vendor's cybersecurity will expose sensitive data of the first company; and determining a weighting factor associated with the risk factor, where the cybersecurity risk score of the first company is adjusted based, at least in part, on the risk factor and the weighting factor.

* * * * *

UNITED STATES PATENT AND TRADEMARK OFFICE
CERTIFICATE OF CORRECTION

| | |
|---|---|
| PATENT NO. | : 11,475,384 B2 |
| APPLICATION NO. | : 16/575262 |
| DATED | : October 18, 2022 |
| INVENTOR(S) | : Nikon Rasumov |

It is certified that error appears in the above-identified patent and that said Letters Patent is hereby corrected as shown below:

In the Specification

At Column 10, Line number 11, delete "count often or less" and replace with --count of ten or less--.

In the Claims

At Column 24, Claim number 17, starting at Line number 35, delete "second information corresponds is combined" and replace with --second information is combined--.

Signed and Sealed this
Twentieth Day of December, 2022

Katherine Kelly Vidal
*Director of the United States Patent and Trademark Office*